R. Grant,
Charging Soda Fountains.
No. 2,970. Reissued June 9, 1868.
Fig. 1.
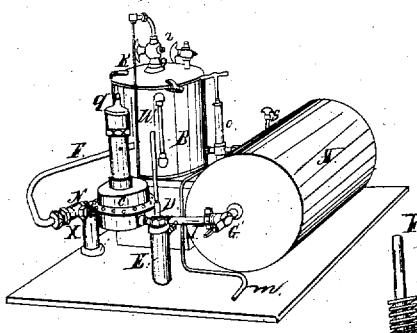
Fig. 3.
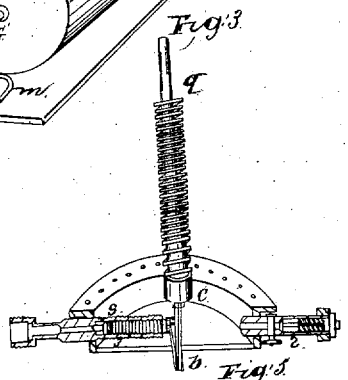
Fig. 2.
Fig. 4
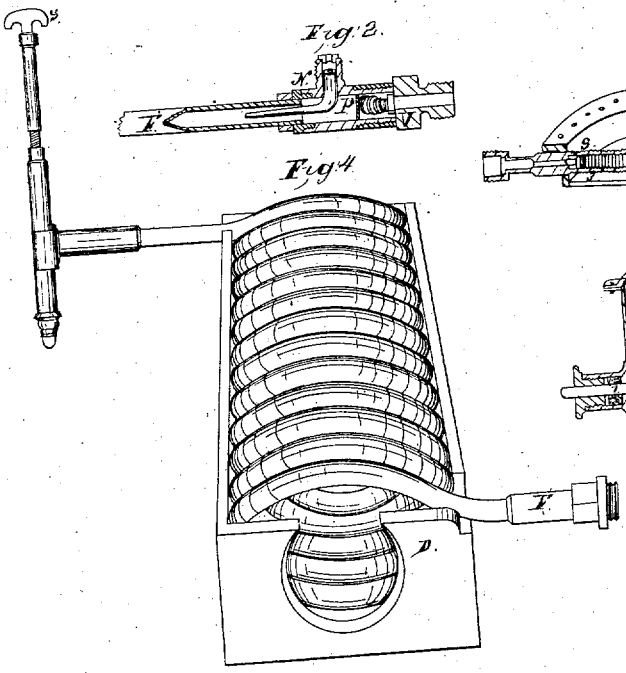
Fig. 5.
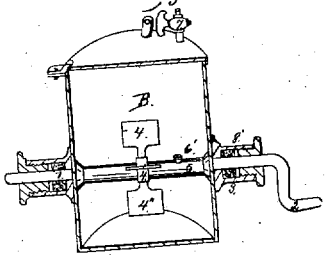
Witnesses:
James P. McLean
Adam Smith
Inventor:
Robert Grant.
THE NORRIS PETERS CO., WASHINGTON, D. C.

United States Patent Office.

ROBERT GRANT, OF BROOKLYN, NEW YORK.

*Letters Patent No.* 73,712, *dated January* 28, 1868; *antedated January* 17, 1868; *reissue No.* 2,970, *dated June* 9, 1868.

IMPROVEMENT IN CHARGING WATER WITH CARBONIC ACID.

The Schedule referred to in these Letters Patent and making part of the same.

TO WHOM IT MAY CONCERN:

Be it known that I, ROBERT GRANT, of Brooklyn, in the county of Kings, and State of New York, have invented certain new and useful Improvements in the Method of and Apparatus for Charging Liquids with Carbonic-Acid Gas; and I hereby declare the following to be a full, clear, and exact description of the same, reference being had to the accompanying drawings, in which—

Figure 1 is a perspective view of an apparatus made in accordance with my invention.

Figure 2 is a vertical section of a gas-injecting chamber, which may be used in connection with the apparatus shown in fig. 1.

Figure 3 is a perspective sectional view of a gas-regulator, which may also be used in my said apparatus.

Figure 4 represents an ice-box or refrigerator, which may be attached to the apparatus.

Figure 5 is a vertical section of a vessel containing the liquid to be charged with gas.

The object I have in view is to facilitate the manufacture of soda or mineral-water, or other liquids, which require to be charged with carbonic-acid or other gas, and to provide means whereby retail dealers, as well as families and others, who cannot themselves conveniently employ apparatus for generating the gas, may have constantly on hand a supply of gas, which can be readily used, as occasion demands, to impregnate or charge the liquid, or to maintain it at a uniform strength.

To this end my invention may be stated in general terms to consist in the method of charging water or other liquids with gas, by the employment of two vessels combined, the one containing the liquid to be charged, the other containing gas, of a pressure greater than that of the atmosphere; the gas-holding vessel being separated from and not connected with the apparatus for generating and compressing the gas with which said vessel is filled.

Under my invention, carbonic-acid gas, for charging water or other liquid, can be made by a wholesale dealer or manufacturer, who compresses it into portable cylinders or vessels, and furnishes it in this state to his customers. The cylinder of compressed gas, after being carried to the place where it is to be used, is connected or coupled with a vessel of ordinary or suitable construction, containing the liquid to be charged. By means of valves or cocks, the gas is then permitted to flow from its cylinder into the water-vessel, where it is mixed by suitable means with the water, a pressure-gauge being employed to indicate when the water has become sufficiently charged. When the supply of liquid thus charged has been drawn off or used up, the vessel may be refilled, and the gas again admitted to it; and this operation may be repeated until the supply of gas is exhausted. Whenever this occurs, the cylinder can be replaced by another, filled with compressed gas. The flow of the gas to the vessel may also be so regulated by means of the valves or cocks as to maintain the charged liquid at a uniform strength.

In addition to the obvious advantages which result from the above-described method of using the gas, it will be seen that there can be no loss attending the manufacture of the gas, as it may be compressed into cylinders, and kept on hand for any length of time. The cylinders may also be transported, and supplied to persons in distant cities, without much additional trouble and expense. There is, moreover, a great saving in the labor and cost of transportation, the pure gas being carried in light, portable cylinders, while, under the old system, the wholesale manufacturer is put to the expense of transporting to his customers the mixed gas and water, contained in heavy cylinders or vessels, of necessarily increased bulk.

To enable those skilled in the art to understand and use my invention, I will now proceed describe the manner in which the same same is or may be carried into effect, by reference to the accompanying drawings.

The apparatus there represented consists substantially of two cylinders, the one, B, containing the liquid to be charged, the other, A, containing the compressed gas, and the two being connected by means of suitable pipes and cocks, which regulate the flow of the gas from cylinder A to the vessel B. With these cylinders are combined a pump, *o*, or other suitable means for supplying the vessel B with water, and a gauge, E, for indicating the pressure of the gas in the said water-vessel.

As shown in fig. 1, the water-vessel rests upon an ice-box, D, containing a mixing-coil and cooler, with which the vessel B is connected by pipes F F′, figs. 1 and 4. The opposite end of the coil is provided with a nozzle and draught-cock, S. The vessel B may be lined with tin or other non-oxidizing material, and may, as represented in fig. 5, contain rotary agitators or blades, 4 4′ 4″, for mixing the gas and water; this, however, is not essential, as any other known or suitable arrangement of the vessel for the purpose of effecting the mixing of the gas with the water, may be employed. In the upper part of the vessel is a cock, *l*, for the escape of the air, when the vessel is being filled with water. In order to thus fill the vessel, a pump, *o*, or other known or suitable means, may be employed. A water-gauge, W, serves to indicate when a sufficient quantity of water has been introduced into the vessel.

In order to regulate the flow of gas, there may be combined with the water and gas-cylinders, a regulator, C, communicating by means of pipe T with the gas-cylinder A, and of pipe R, with the water-cylinder B. The latter pipe opens into the head or upper end of the water-cylinder, and is provided with a stop-cock, Z, which regulates the admission of the gas to the cylinder. The regulator C also communicates by means of a suitable conduit, provided with a stop-cock, X, with what may be called the injector-chamber N, located between the pipes F F′, and communicating with both. The gas from the regulator, when occasion requires, is discharged into the pipe F′ through an injector, J, arranged in the chamber N, as shown in fig. 2.

The construction of the regulator is shown more clearly in fig. 3. The screw-valve 3, which regulates the flow of gas from the cylinder A, is connected by a toggle-joint with the stem 9 of the air-tight plunger, which is surrounded, as is usual, by a spiral spring, by means of which, and the pressure of the gas within the regulator, the valve is operated in the manner well known to those acquainted with mechanism of this kind. The eduction or outlet of the regulator is provided with a check-valve, 2, as shown plainly in the figure referred to.

The cylinder A, which supplies to the water-cylinder the carbonic-acid gas, is filled with the compressed gas under an atmospheric pressure of from four hundred and fifty to six hundred pounds, and as it contains only dry gas, which does not affect the metal of which it is composed, there is no necessity for lining it with a non-oxidizing material, such as required in the cylinder B.

The connection between the gas-cylinder and that part of the apparatus with which it may be placed in direct communication, is effected by means of a coupling-pipe, T, provided with a stop-cock, G; and at a point intervening between the cylinder and the vessel with which the pipe T communicates, is arranged a gauge, E, for ascertaining the pressure of the gas in the water-vessel, so that when it indicates that the water has become sufficiently charged with gas, the flow of the latter to the water may be arrested by means of the stop-cock G.

The apparatus thus constructed is operated in the following manner:

A portable cylinder, A, of compressed gas, which, we will suppose has been supplied by the manufacturer, is connected with the stationary part of the apparatus, consisting of the water-vessel B, and the appurtenances hereinbefore indicated, by means of the coupling T, the vessel B being filled with water to a suitable height. The gas is then turned on from the cylinder, by means of the stop-cock G, the regulator, if one be used, being graduated to about ninety pounds' pressure to the square inch, by means of the air-tight plunger and spiral spring operating upon the screw-valve 3, through the intermediary of the toggle-joint 6. After this has been done, the cock Z is opened, so as to admit gas from the regulator into the water-cylinder, and the agitators 4 4′ 4″ are revolved, in order to mix the gas with the water as thoroughly and intimately as possible. When fresh water is again pumped into the vessel B, the gas may be allowed to pass from the regulator to the injector P, fig. 2, by opening cock X, figs. 1 and 2.

When it is desired to draw the charged liquid for use, the draught-cock S, fig. 4, is opened, thus allowing the water to flow through the mixing-coil from the water-tank or vessel B, under a pressure of ninety pounds to the square inch. As this water passes the injector P, fig. 2, the gas therein mingles intimately with the water, and as the water and gas pass through the mixing-coil, the combination becomes complete by the final absorption of the gas by the water.

Whenever the gauge E indicates that the water in the vessel B is sufficiently charged, the cock G can be turned, so as to cut off further supply of gas, and then, by opening or closing this stop-cock, according to the indications of the gauge, the charged water may be maintained at a uniform strength.

When the supply of gas in any one cylinder, A, is exhausted, it can be readily uncoupled from the pipe T, and replaced by another cylinder filled with the compressed gas.

I do not confine myself to the above arrangement alone, from the fact that it may be found desirable or necessary to use the individual parts or modifications thereof separately, and otherwise adapted for similar purposes.

Thus, in order to fill the mixing-vessel, B, with water, the pump *o*, fig. 1, need not, as hereinbefore mentioned, be used, as the same result can be produced by means of a reservoir of water placed at a sufficient elevation, and connected with the water-induction pipe *m*; and moreover, not only the pump, but likewise the water-tank B itself, may be dispensed with by directly connecting the induction-water pipe *m* with the water-pipe F, the water flowing through the pipe being charged by the gas issuing from the injector P. The water will thus be carried along or propelled through the pipe F, and through the mixing and cooling-coil, if one be used, by the force or head of the jet of gas which is discharged into it.

Having now described my invention, and the manner in which the same is or may be carried into effect, I would observe, that in order to successfully manufacture carbonic-acid water according to my method, it is deemed important that the gas should be compressed to its utmost capacity consistently with its preserving its gaseous form, and I have found that about four hundred and fifty pounds to the square inch at ordinary temperature to be the best. I do not, therefore, claim the use of this gas in solid or liquid form, *i. e.*, compressed beyond four hundred and fifty pounds to the square inch; but

What I claim, and desire to secure by Letters Patent, is—

1. The charging of water or other liquid with carbonic-acid gas, by the use, in combination, of two vessels, one containing the water or other liquid to be charged with carbonic-acid gas, and the other containing carbonic-acid gas at a pressure greater than that of the atmosphere, the gas-holding vessel being separated from and not connected with the apparatus, by means of which the gas was generated or compressed.

2. The combination, with two vessels, one to contain water or other liquid, the other to contain gas at a high pressure, but disconnected from the gas-generator, of pipes and coupling, and suitable stop-cocks, for connecting and disconnecting the said vessels, as herein described, so that the gas-holding vessel may be readily replaced by others at pleasure.

3. In apparatus, such as herein described, and claimed in the preceding clause, I claim the use of a gauge for indicating the pressure, in the water-vessel, of the liquid charged with gas, substantially as and for the purposes set forth.

4. The combination, with an independent gas-holding vessel, of a water-vessel, provided or connected with a pump or other means of supplying the same with water or other liquid, substantially as herein described.

5. The combination of the water and gas-holding vessels, as herein described, with an injector, whereby the liquid from the water-vessel may be more highly charged with gas from the gas-holder, substantially as set forth.

6. In combination with a gas-holder, disconnected from the gas-generator, I claim a water-vessel provided with means of agitating and thoroughly mixing the water and gas which it may contain, substantially as herein specified.

7. In apparatus for charging water or other liquids with gas, as herein specified, I claim the use of a regulator such as described, for the purpose of regulating the flow of gas, and maintaining a uniform pressure in the mixing-vessel, as shown and set forth.

8. The combination, with a gas-holder, of an injector, connected with a water-reservoir, as herein described, so that the water, as it flows through the injector-chamber, shall become charged with the gas, substantially as set forth.

In testimony whereof, I have signed my name before two subscribing witnesses.

ROBERT GRANT.

Witnesses:

J. W. STANTON,

T. SARGEANT.